3,257,702
METHOD OF FABRICATING PLIABLE BRAIDED POLYFILAMENTOUS THREADS
Leonard D. Kurtz, Woodmere, N.Y., assignor to Sutures, Inc., Coventry, Conn., a corporation of New York
No Drawing. Filed Mar. 10, 1965, Ser. No. 438,722
6 Claims. (Cl. 28—72)

This invention relates to methods of fabricating pliable polyfilamentous materials. More particularly, the invention relates to methods of fabricating very pliable plastic polyfilamentous threads and even more particularly to the fabrication of pliable sutures. This invention is a continuation-in-part of my co-pending applications Serial No. 366,187, filed May 8, 1964; Serial No. 323,891, filed November 15, 1963; Serial No. 230,084, filed October 12, 1962, now Patent No. 3,213,506; Serial No. 220,085, filed August 28, 1962; and Serial No. 435,741, filed February 26, 1965, and titled, "Pliable Threads."

As is more fully discussed in the aforementioned co-pending applications, braided plastic threads, for example, braided polyethylene terephthalate threads, have certain physical and chemical properties superior to naturally occurring materials for many applications. For example, polyfilamentous polyethylene terephthalate threads are suitable for use as surgical sutures because of the high tensile strength and inertness thereof. However, the thread is very stiff relative to, for example, silk of equal tensile strength and/or diameter and this lack of pliability causes the knotting characteristics of the thread to be quite poor for surgical use. It was an object of my co-pending applications to improve the characteristics of the plastic materials and, according to the methods disclosed therein, both the lubricity and the pliability of various plastic threads can be modified extensively such that the knotting properties are similar to those of silk threads.

It is an object of the present invention to provide a novel method of fabricating soft and pliable thread materials. It is a further object of the present invention to provide a method for fabrication of soft and pliable polyfilamentous plastic materials. It is still a further object of the invention to provide a method for the fabrication of very soft and pliable plastic sutures, such as polyester sutures.

These and other objects which will become clear in view of the following description which includes a preferred embodiment of practicing the invention, are achieved by subjecting a hot-stretched polyfilamentous plastic strand to flexion during the process of fabricating the strand.

In order to reduce the elasticity and memory (tendency to return to original length) of a plastic thread to make the thread suitable for certain uses, including surgical suture use, it is necessary to hot-stretch the thread at a temperature above its glass transition temperature, which will permit a change in configuration without the introduction of internal stresses. Conveniently, the thread may be heated to its softening point. Tension is applied to the heated thread such that the thread is stretched, for example, up to its breaking point. Elongation of over 10% and particularly from about 20% up to, but not including, the breaking point are suitable to reduce the elasticity and memory of the thread sufficiently. The temperature necessary to reduce or eliminate elasticity and memory is called the heat-setting temperature which is known for various plastic materials. For polyester terephthalate, a temperature of 320° F. or above will suffice.

While the heat-setting-step is necessary in order to render the material useful for several applications, it is believed that the step may render a polyfilamentous thread even more than naturally stiff due to adhesion or cohesion between adjacent elements of the polyfilamentous material. Thus, while I do not intend to be bound by any theoretical explanation of my invention, it is believed that the cohesive or adhesive forces present in a hot-stretched polyfilamentous strand are reduced or eliminated according to the present invention to provide a softer and more pliable thread having knotting characteristics approaching that of silk and, therefore, eminently suitable for use as surgical sutures.

According to the present invention, the hot-stretched polyfilamentous thread is subjected to flexion which is believed to disrupt the cohesive forces between adjacent elements of the thread. The flexion can be applied in any of several convenient manners as will be brought out in detail in the examples which follow. The flexion applied to the thread should, in all cases, be sufficient to cause relative movement between adjacent thread elements of the polyfilamentous strand. It is believed that this relative motion tends to disrupt or eliminate cohesive and adhesive forces between adjacent elements of the strand. Any manner of flexion, therefore, which provides suitable relative movement of strand elements, is suitable and therefore the strands may be flexed by hand. As relative movement of strand elements is believed to be the prime factor in achieving soft and pliable thread materials, it is believed that the greater the relative movement, the softer and more pliable the resulting thread. Of the two factors, contributing to relative movement—velocity and distance—it is believed that the latter is more important. Thus, the degree of flexion, as opposed to the rapidity of flexion, is considered to be the most important parameter of the present improvement. Thus, a strand is preferably flexed more than 45°.

*Example I*

A 5/0 polyethylene terephthalate thread braided from eight strands of 30 denier polyethylene terephthalate was stretched at approximately 380° F. to an elongation of approximately 50%. A length of the hot-stretched thread was separated and repeatedly flexed by hand along its length. Flexion was achieved by grasping the thread in both hands and flexing back and forth for a few seconds and then advancing along the length of the thread while continuing the flexing motion. In this manner, it is possible to repeatedly flex the thread at an angle of about 90°. A length of the flexed thread and an equal length of the hot-stretched unflexed thread were wound into coils of substantially identical diameter. The coil of flexed thread was markedly more pliable and softer than the unflexed thread.

*Example II*

A length of the hot-stretched polyester thread prepared to Example I was flexed by passage between opposing-comb-like members having staggered teeth. The thread was placed across the teeth of a horizontally disposed and stationary comb-like member. The member comprised a plurality of rounded pegs or teeth having a diameter of about $\frac{1}{15}''$ and spaced with a gap of approximately $\frac{3}{32}''$ therebetween. An upper comb-like member was disposed above the lower member and pivoted so that the teeth thereof were moveable into the spaces between the teeth of the lower member. As the thread was advanced across the lower member, the upper comb member was repeatedly caused to mesh with the lower member thus causing the strand to be flexed at several places along its length. The strand was caused to be advanced intermittently and synchronously with the movement of the upper member. In this manner, the strand was flexed between 45 and almost 90° each time the comb-like members intermeshed. The amount of flexion can, of course, be varied by the extent to which the upper comb member is permitted to engage with the lower comb member. It is, of course, desirable that the thread rotate about its own longitudinal axis during the flexion process in order to more effectively flex the thread. This is very simply accomplished by rotating a take-up spool which simultaneously pulls the thread through the comb members. Hot-stretched thread flexed in this manner was again compared with the unflexed thread and was found to be remarkably more soft and pliable.

*Example III*

Thread softened according to foregoing Example I was gathered into a skein and immersed in an aqueous solution of Teflon. Dupont blend 2510 containing about 58% by weight of Teflon (polytetrafluoroethylene) particles having an average particle size of 0.5 micron was used. Triton X–100 (Rohm and Haas) and agitation were used to keep the particles well dispersed.

The skein of thread was kept immersed in the Teflon dispersion for 15 minutes to permit the particles of Teflon lubricant to permeate into the interstices of the thread. While the immersion time can vary widely, it has been found that 15 minutes is adequate for skeins weighing up to 50 pounds as determined by measuring the amounts of Teflon picked up after final processing.

The excess Teflon was then removed according to Example I of my co-pending application Serial No. 323,891. Thread produced in this manner is extremely pliable and has knotting characteristics substantially identical to that of silk sutures. Accordingly, a suture produced in this manner is eminently suitable for surgical use.

While I have exemplified preferred methods of flexing thread in order to achieve pliability and softness, it is to be understood that any convenient method of flexing the thread would be suitable. Accordingly, it is possible to bend the thread more than 90° by the selection of suitable equipment. For instance, with the "comb" members of Example II, it is possible to bend the thread almost 180° by causing the upper member to pass fully through the spaces in the lower member.

I claim:

1. In a method of fabricating pliable polyfilamentous braided strands, the improvement comprising the step of subjecting a hot-stretched polyfilamentous plastic braided strand to repeated flexion to cause relative movement between adjacent filaments of the polyfilamentous braided strand to thereby provide a soft and pliable product.

2. A method of fabricating pliable polyfilamentous braided strands comprising the steps of hot stretching a polyfilamentous braided strand to reduce the elasticity and memory of the braided strand and subsequently subjecting the hot-stretched braided strand to repeated flexions to cause relative movement between adjacent filaments of the strand to thereby provide a soft and pliable polyfilamentous strand product.

3. In a method of fabricating hot-stretched braided polyester polyfilamentous sutures, the improvement comprising subjecting the polyfilamentous polyester to repeated flexions to cause relative movement of adjacent filaments of the suture to thereby soften the suture.

4. A method according to claim 3 wherein the polyester is polyethylene terephthalate.

5. A method of fabricating soft and pliable braided polyester sutures comprising the steps of stretching a braided polyfilamentous polyester strand up to 50% while maintaining the strand at least at the heat-setting temperature thereof, subjecting the hot-streched srand to repeated flexions to cause relative movement of adjacent filaments of the suture, and providing a lubricant on the surface and within the interstices of said suture.

6. A method according to claim 5 wherein the polyester is polyethylene terephthalate and the lubricant is polytetrafluoroethylene.

References Cited by the Examiner

UNITED STATES PATENTS

| | | | |
|---|---|---|---|
| 2,974,392 | 3/1961 | Timbie | 28—1 |
| 3,024,517 | 3/1962 | Bromley et al. | 28—1 |
| 3,110,151 | 11/1963 | Bunting et al. | 28—1 |
| 3,143,784 | 8/1964 | Scott | 28—1 |

DONALD W. PARKER, *Primary Examiner.*

L. K. RIMRODT, *Assistant Examiner.*